UNITED STATES PATENT OFFICE.

CHARLES JONES AND WILLIAM STANDING, OF DE SOTO, ILLINOIS.

IMPROVEMENT IN THE MANUFACTURE OF CORN-FLOUR.

Specification forming part of Letters Patent No. 85,592, dated January 5, 1869.

*To all whom it may concern:*

Be it known that we, CHARLES JONES and WILLIAM STANDING, of De Soto, in the county of Jackson and State of Illinois, have invented a new and useful Improvement in Corn-Flour; and we do hereby declare that the following is a full, clear, and exact description thereof, which will enable others skilled in the art to make and use the same.

Our invention comprehends the production of a new article of manufacture consisting of an admixture of maize or Indian corn with wheat, "bran-dusting," and "middling," so called.

The method of preparation is as follows: The corn is first thoroughly cleaned. It must then be dried; but before it enters the drying-machine it is submitted to the action of low steam, or steam at about the atmosphere, for the purpose of penetrating the soft oily portion of the corn, to assist in preventing the meal from souring. In so steaming the corn we usually pass it through a current of steam. It is then passed through any suitable grain-drying apparatus, to expel every particle of moisture from it.

The corn is then ground in the usual manner of grinding dried corn. The meal thus obtained is then bolted through an extra fine silk-and-wire bolting-cloth, thereby separating the floury portion of the meal from the coarser particles of the same, thus obtaining a fine article of corn-flour having within itself the necessary raising qualities to produce, when baked, light bread, biscuit, or griddle-cakes, but lacking the requisite adhesive properties for producing a crust and a general coherent mass, requisite in loaf-bread. In order to supply this deficiency, we take the middlings and bran-dustings of wheat, as these contain a large quantity of gluten, (which is the adhesive constituent lacking in the corn-flour,) and after regrinding the middling mix the middlings and bran-dustings together and bolt the mixture through a fine bolting-cloth, which provides a fine article of flour.

The middlings and bran-dustings are taken in equal parts and mixed with the corn-flour in about the following proportions: Bolted middlings and bran-dustings, one hundred pounds; corn-flour, two hundred pounds.

When thoroughly mixed, the result is a fine article of nutritious flour suitable for bread, biscuit, cake, griddle-cakes, or other forms of cooking-flour.

Having thus described our invention, we claim as new and desire to secure by Letters Patent—

1. The process for obtaining corn-flour, substantially as herein described.

2. Flour composed of corn-flour and bolted middlings and bran-dustings, substantially as herein described, as a new article of manufacture.

The above specification of our invention signed by us.

CHARLES JONES.
WILLIAM STANDING.

Witnesses:
CHARLES M. BRADLEY,
JAS. BRADLEY.